(12) United States Patent
Böhm et al.

(10) Patent No.: US 7,254,989 B2
(45) Date of Patent: Aug. 14, 2007

(54) LEAK DETECTING DEVICE

(75) Inventors: Thomas Böhm, Köln (DE); Werner Grosse Bley, Bonn (DE)

(73) Assignee: Inficon GmbH, Koln (DE)

( * ) Notice: Subject to any disclaimer, the term of this patent is extended or adjusted under 35 U.S.C. 154(b) by 92 days.

(21) Appl. No.: 10/558,232

(22) PCT Filed: May 11, 2004

(86) PCT No.: PCT/EP2004/005008

§ 371 (c)(1),
(2), (4) Date: Nov. 23, 2005

(87) PCT Pub. No.: WO2004/106882

PCT Pub. Date: Dec. 9, 2004

(65) Prior Publication Data

US 2007/0000309 A1    Jan. 4, 2007

(30) Foreign Application Priority Data

May 30, 2003   (DE) ................................ 103 24 596

(51) Int. Cl.
*G01M 3/04* (2006.01)
(52) U.S. Cl. .......................................... 73/40.7; 73/40
(58) Field of Classification Search .................... 73/40, 73/40.7
See application file for complete search history.

(56) References Cited

U.S. PATENT DOCUMENTS 4,419,882 A * 12/1983 Ishii et al. .................... 73/40.7
5,585,548 A   12/1996 Grosse Bley et al.
6,415,650 B1 * 7/2002 Bohm et al. ................. 73/40.7

FOREIGN PATENT DOCUMENTS

WO   WO 96/24828      8/1996
WO   WO 01/46667 A1   6/2001

* cited by examiner

*Primary Examiner*—Daniel S. Larkin
(74) *Attorney, Agent, or Firm*—Marjama & Bilinski LLP

(57) ABSTRACT

A leak detecting device of the counterflow type includes a high vacuum pump having an inlet connected to a mass spectrometer. In addition, a prevacuum pump is provided having an inlet connected to an outlet of the high vacuum pump and a leak detecting device input. A connecting conduit is further provided between the leak detecting device input and an intermediate inlet of the high vacuum pump. A first valve of variable conductance is arranged in the course of the connecting conduit. Valves with a large inner diameter are expensive while valves with a small inner diameter show considerable resistance even in a fully opened state. A second valve arranged parallel to the first adjustable valve is provided in the course of the connecting conduit; thereby allowing the first and second valves to have relatively small inner diameters arranged in the connecting conduit, wherein the combined conductance of both opened valves is considerably increased.

7 Claims, 1 Drawing Sheet

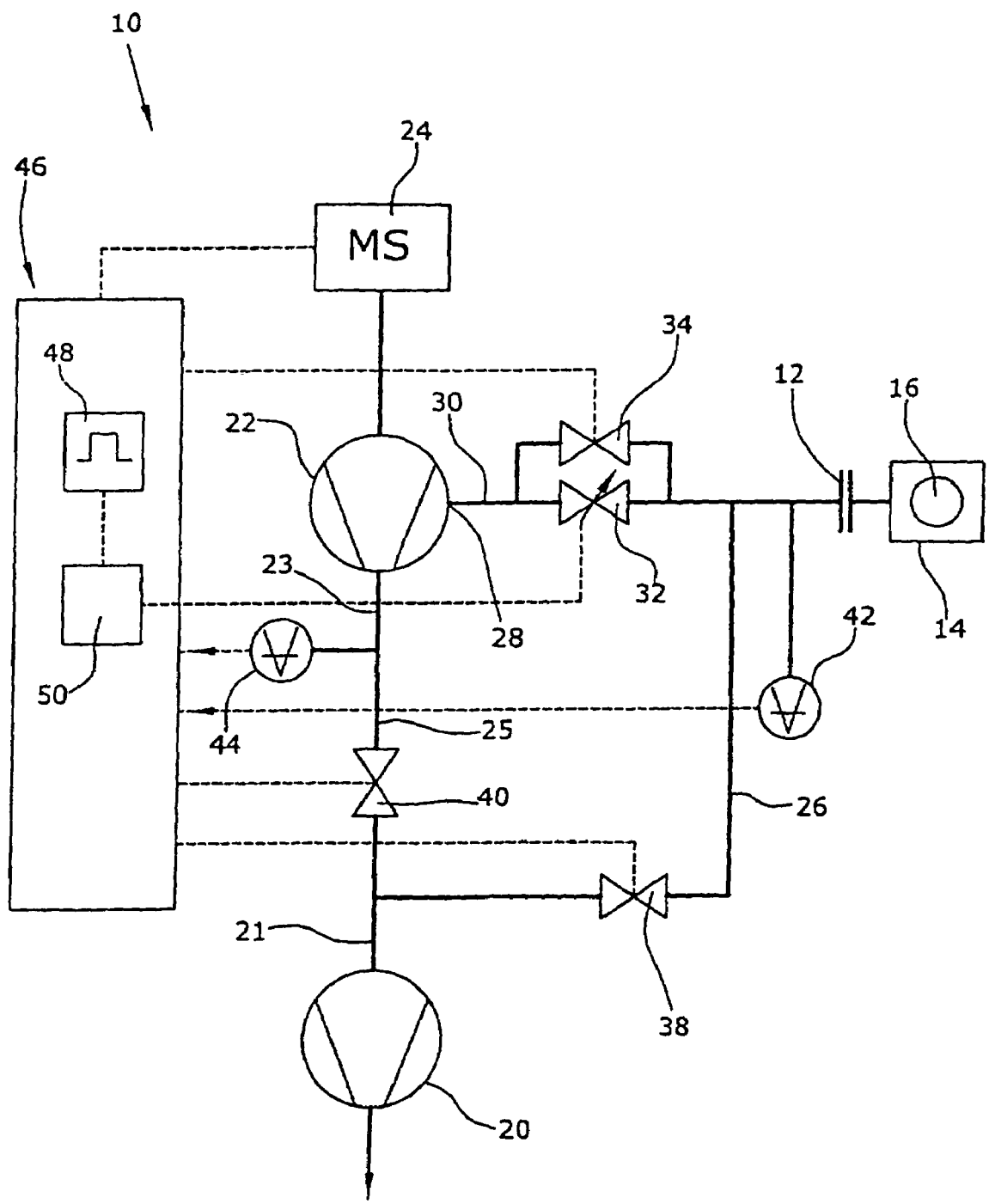

LEAK DETECTING DEVICE

FIELD OF THE INVENTION

The invention relates to a leak detecting device working according to the counterflow type.

BACKGROUND OF THE INVENTION

Such a leak detecting device is known from WO 96/24828. In a leak detecting device of this type, the sensitivity and the detection limit of the leak detecting device can be respectively adjusted. To this end, the high vacuum pump the inlet of which is connected with a mass spectrometer and the outlet of which is connected with a prevacuum pump is provided with an intermediate inlet which is connected to the leak detecting device input via a connecting conduit. In the course of the connecting conduit, a valve of adjustable conductance is provided. The adjustable valve serves as an adjustable throttle while the pressure at the leak detecting device input is so high that an unthrottled connecting conduit in the mass spectrometer would lead to an internal pressure that is so high that the mass spectrometer does not work. For reasons of costs, the inner diameter of the valve is limited to a diameter as small as possible. Thereby, however, a considerable throttle effect is maintained, reducing the suction capacity, even if the valve is completely open.

SUMMARY OF THE INVENTION

It is an object of the invention to provide an inexpensive leak detecting device having an improved suction capacity.

This object is solved, according to the invention.

The leak detecting device according to the invention comprises a second valve in the course of the connecting conduit, which is arranged parallel to the adjustable first valve. By the second valve, the overall conductance of all opened valves in the course of the connecting conduit is considerably increased so that a good overall conductance can also be realized with relatively inexpensive valves with a small inner diameter. Thus, the need of a very expensive single valve with a large inner diameter, i.e., with a high conductance, can be avoided. Both valves are arranged parallel to each other, i.e., they are parallel to each other in the course of the only connecting conduit between the leak detecting device input and the only intermediate inlet of the high vacuum pump.

With leak detecting devices with a dry-running pump, e.g., a diaphragm pump, as a prevacuum pump, a test chamber connected to the leak detecting device input is initially evacuated down to about 10-5 mbar. As soon as the vacuum has reached or passed below this pressure range, the adjustable first valve is slowly opened. The regulation of the adjustable valve can be effected in dependence on the input pressure, i.e., in dependence on the pressure at the input of the leak detecting device. Since the adjustable first valve is not completely opened, a measurement may already be started at prevacuum pressure values still clearly above the maximum admissible pressure at the intermediate input of the high vacuum pump because the adjustable first valve acts as a throttle. Because of the throttle effect, such a low pressure is generated at the intermediate inlet of the high vacuum pump that the maximum admissible pressure is not reached in the mass spectrometer either and the mass spectrometer may already start measuring. The conductance of the adjustable valve in the connecting conduit is set such that it is as high as possible, the maximum admissible pressure in the mass spectrometer, however, is not exceeded. As soon as the prevacuum pressure value falls below a predetermined limit, the adjustable valve can be fully opened and the second valve can be fully opened as well. Thereby, the combined conductance of the two valves in the connecting conduit is increased so that the suction capacity of the high vacuum pump can be fully utilized as well.

In oil-sealed prevacuum pumps, the leak detecting device input is evacuated to about 1 mbar, and when the pressure decreases below this value, the adjustable first valve is opened first, and later on, the second valve in the course of the connecting conduit is opened. Thereby, a sensitive measurement is made possible at an early time. From a pressure of $10^{-2}$ mbar up, both parallel valves can be fully opened to provide a suction capacity at the leak detecting device input, which is as great as possible.

By providing a second valve parallel to the first adjustable valve, a high conductance is obtained when the valves are open, whereby valves with a relatively small diameter or cross-section may be used, which are available at low costs.

According to one version of the invention, the second valve is a switch valve that can be switched between an open and a closed condition. The second valve serves to increase the conductance of the overall valve arrangement. Thus, there is no need for an adjustable valve for the second valve and an inexpensive switch valve may be used.

Preferably, the adjustable first valve is continuously adjustable. Thereby, the first valve can be continuously adapted to the pressure conditions.

According to one version of the invention, the inner diameter of each of the first and the second valves is smaller than 13 mm. Valves with an inner diameter of less than 13 mm are relatively inexpensive so that the overall valve arrangement in the connecting conduit can thus be realized in a more inexpensive manner than in the form of a single valve with a correspondingly large inner diameter.

Preferably, a regulation device with a modulation module is provided which controls the opening of the adjustable first valve and modulates the gas flow through the adjustable first valve. By modulating the gas flow through the connecting conduit into the intermediate inlet of the high-vacuum pump, the sensitivity can be increased since the effective signal can be filtered out of the total signal by modulation. The modulation by the adjustable first valve can be effected with the second valve opened or closed.

BRIEF DESCRIPTION OF THE DRAWINGS

Hereinafter, an embodiment of the invention is explained in detail with reference to the drawing.

FIG. 1 shows an embodiment of a leak detecting device of the counterflow type, according to the invention.

DETAILED DESCRIPTION

In the FIGURE, a leak detecting device 10 is illustrated which comprises a leak detecting device input 12 to which a test chamber 14 with a test sample 16 is connected. The test sample 16 contains a test gas, e.g., helium, of which even small amounts are detected by the leak detecting device 10.

The leak detecting device 10 is substantially formed by a prevacuum pump 20, a high vacuum pump 22 and a mass spectrometer 24 which are interconnected by gas lines in this order. Further, a bypass line 26 is provided between the leak detecting device input 12 and an inlet 21 of the prevacuum pump 20, and a connecting conduit 30 is provided between the leak detecting device input 12 and an intermediate inlet 28 of the high vacuum pump 22. In the course of the connecting conduit 30, two valves are arranged, namely a first valve 32 that is continuously adjustable with respect to its conductance and parallel thereto a second valve 34 that is configured as a switch valve. In the course of the bypass line 26, a bypass line stop valve 38 is provided and in the conduit 25 between the prevacuum pump inlet 21 and a high vacuum pump outlet 23, a high vacuum pump stop valve 40 is provided. For detecting the pressure, a test chamber pressure measuring apparatus 42 is provided at the leak detecting device input 12 and a prevacuum pressure measuring apparatus 44 is provided at the outlet 23 of the high vacuum pump 22. For controlling and regulating the leak detecting device 10, a regulation device 46 is provided which, among other things, comprises a modulation module 48 and a valve control module 50. The high vacuum pump 22 is a turbomolecular pump but may also be configured as a friction vacuum pump of a different configuration.

The prevacuum pump 20 is configured as a dry-running pump, e.g., as a diaphragm pump, but may also be configured as an oil-sealed prevacuum pump.

The adjustable first valve 32 is a continuously controllable proportional valve with an inner diameter of 6 mm. The second valve 34 is a switch valve that is adapted to be switched between a fully open and a fully closed state and also has an inner diameter of 6 mm.

The prevacuum pressure measuring apparatus 44 and the test chamber pressure measuring apparatus 42 are connected to the regulation device 46 by respective signal lines.

The two stop valves 38, 40 as well as the two valves 32, 34 in the course of the connecting conduit 30 are connected to the regulation device 46 via respective control lines.

In order to detect a leak by means of the leak detecting device 10, the test chamber 14 with a test sample 16 containing the test gas helium is connected to the leak detecting device input 12. Both the high vacuum pump stop valve 40 and the two valves 32, 34 arranged in the connecting conduit 30 are initially closed while the stop valve 38 in the bypass line is open. The prevacuum pump 20 is switched on and evacuates the test chamber 14 via the bypass line 26. As soon as the test chamber pressure measuring apparatus 42 detects a pressure below 5 mbar, the high vacuum pump stop valve 40 is opened so that test gas is able to flow in counterflow through the high vacuum pump 22 to the detector, the mass spectrometer 24, and can be detected there. The bypass line stop valve 38 is closed.

From a test chamber pressure of 5 mbar on downward, the first valve 32 which is of variable conductance is slowly opened by the regulation device 46 and the valve control module 50. The first valve 32 is respectively opened only to such a degree that the gas pressure at the intermediate inlet 28 of the high vacuum pump 22 is below a pressure value at which a sufficiently low pressure is secured in the mass spectrometer 24. With the test chamber pressure further decreasing, the first valve 32 is opened farther so that the conductance of the first valve 32 increases. As soon as the test chamber pressure has reached the maximum admissible pressure at the intermediate inlet 28, the first valve 32 is completely opened and the second valve 34 is opened as well. By opening the second valve 34, the combined conductance of the valve arrangement consisting of the two valves 32, 34 of the connecting conduit 30 is significantly increased immediately so that the suction capacity of the high vacuum pump 22 is not degraded by the fully opened valves 32, 34.

Regulating and opening the two valves 32, 34 in the connecting conduit 30 is automatically effected by the regulation device 46 in dependence on the test chamber pressure.

To increase the measuring sensitivity, the valve control module 50 can be driven by the modulation module 48 in such a manner that the conductance of the first adjustable valve 32 is modulated at a constant frequency, while the second valve 34 is either open or closed. The measuring signal generated by the mass spectrometer 24 is correspondingly filtered in the regulation device 46 so that only the effective signal is available for being evaluated.

We claim:

1. A leak detecting device of the counterflow type, said device comprising:
   a high vacuum pump having an inlet connected to a mass spectrometer;
   a prevacuum pump having an inlet connected to an outlet of the high vacuum pump and a leak detecting device input;
   a connecting conduit between the leak detecting device input and an intermediate inlet of the high vacuum pump;
   a first valve in the course of the connecting conduit, said first valve having an adjustable conductance; and
   a second valve in the course of the connecting conduit, said second valve being arranged parallel to the adjustable first valve.

2. A leak detecting device according to claim 1, wherein the second valve is a switch valve that is adapted to be switched between a fully opened and a fully closed state.

3. A leak detecting device according to claim 1, wherein the conductance of the adjustable first valve is continuously adjustable.

4. A leak detecting device according to claim 1, wherein the inner diameter of each of the first and second valves is smaller than 13 mm.

5. A leak detecting device according to claim 1, wherein the prevacuum pump is an oil-sealed pump.

6. A leak detecting device according to claim 1, wherein the prevacuum pump is a dry-running pump.

7. A leak detecting device according to claim 1, further comprising a regulation device having a modulation module that controls the opening of the adjustable first valve and modulates the gas flow through the adjustable first valve.

* * * * *